Jan. 30, 1968  W. A. MILLER  3,366,615
METHOD FOR AGGLOMERATING GRANULAR POLYTETRAFLUOROETHYLENE
Filed Sept. 16, 1964  2 Sheets-Sheet 1

INVENTOR
WILLIAM A. MILLER
BY Ernest A. Polin
ATTORNEY

CONVENTIONAL GRANULAR RESIN

FREE-FLOWING HIGH STRENGTH GRANULAR RESIN

United States Patent Office 3,366,615
Patented Jan. 30, 1968

3,366,615
METHOD FOR AGGLOMERATING GRANULAR POLYTETRAFLUOROETHYLENE
William A. Miller, Somerville, N.J., assignor to Allied Chemical Corporation, New York, N.Y., a corporation of New York
Filed Sept. 16, 1964, Ser. No. 396,967
6 Claims. (Cl. 260—92.1)

ABSTRACT OF THE DISCLOSURE

A free flowing, high strength, granular polytetrafluoroethylene resin comprising agglomerated particles having average size, wet sieve, within the range of about 200 to 800 microns is obtained by subjecting an ultra-fine, granular polytetrafluoroethylene resin having average particle size, wet-sieve, of less than 100 microns to agitation in a medium consisting of water, the ultra-fine, granular resin to water ratio being in the range of from 0.1 to 8.0 pounds per gallon, at temperature above about 40° C. until agglomeration of the resin particles occurs and separating the resulting agglomerated resin particles from the water medium.

BACKGROUND OF THE INVENTION

Figure 1:
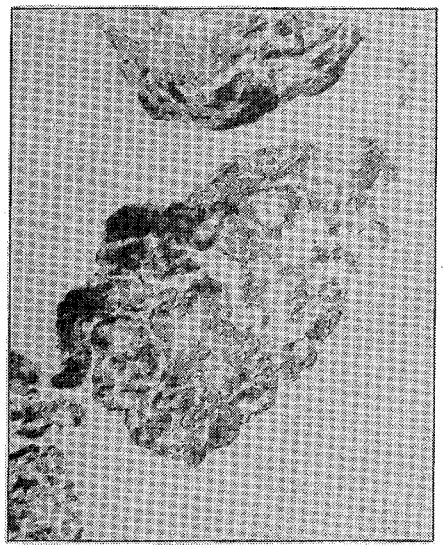

Free-flowing, coarse, granular polytetrafluoroethylene resins are well known commercially and have been employed in the manufacture of rod and sheeting. These resins, however, possess relatively poor physical properties due to their high residual void content. Where superior physical properties are required, ultra-fine, granular polytetrafluoroethylene resins have been used. Although the ultra-fine, granular resins exhibit outstanding physical properties, they are burdened by poor handling properties and low bulk density.

As a result, ultra-fine, granular polytetrafluoroethylene resins have been used where maximum physical properties are required, even at the expense of increased fabrication difficulty, such as for electrical or military applications. On the other hand, the free-flowing, coarse, granular polytetrafluoroethylene resins have been employed where better handling properties are desired. Thus, two classes of resin have been required, depending on the requirements of the particular application. The decision faced by the fabricator has been whether to attain high physical properties or less difficulty in fabrication.

Accordingly, there is a distinct need in the art for an "all-purpose" polytetrafluoroethylene resin which possesses excellent physical properties together with superior handling properties. The fulfillment of this need is an object of the present invention. A further object is to provide a polytetrafluoroethylene resin which, in addition to the above properties, has further advantages, such as being compressible at a low pressure to a dense, strong preform having substantially no void content which is capable of being molded into thin sheets having a high degree of uniformity. A still further object is to provide a process for the obtainment of such a polytetrafluoroethylene resin. Other objects and advantages of the invention will be apparent from the following description and examples.

In accordance with the invention, a novel free-flowing, high strength, granular polytetrafluoroethylene resin having an average particle size, wet-sieve, within the range of about 200 to 800 microns is obtained by subjecting an ultra-fine, granular polytetrafluoroethylene resin having an average particle size, wet-sieve, of less than 100 microns, preferably no greater than about 50 microns, to agitation in aqueous medium maintained at a temperature above about 40° C. until agglomeration of the resin particles occurs and separating the resulting agglomerated resin particles from the aqueous medium.

The novel high strength, granular polytetrafluoroethylene resin of this invention comprises free-flowing agglomerated particles having an average wet-sieve size within the range of about 200 to 800 microns, said resin having a bulk density of at least about 500 grams per liter, a flow time of less than 200 seconds, a tensile strength of at least about 3600 p.s.i., a dielectric strength of at least about 1200 volts per mil, a percent elongation of at least about 300 and a required preform pressure not in excess of about 2000 p.s.i.

The ultra-fine, granular polytetrafluoroethylene resin treated in accordance with the process of this invention has an average particle size, wet-sieve, of no greater than 100 microns and may be prepared by comminuting coarse granular polytetrafluoroethylene resin to the desired particle size. Coarse, granular polytetrafluoroethylene resin is obtained by polymerizing tetrafluoroethylene in an aqueous phase containing a free-radical catalyst. The coarse resin comprises particles having a total surface area of from 1 to 4 square meters per gram as measured by nitrogen absorption.

The starting material is preferably a porous, non-fibrous, ultra-fine resin having an average particle size, wet-sieve, of no greater than about 50 microns. Such resin may be obtained by reduction of coarse granular resin in an air mill, as described and claimed in my copending application Ser. No. 321,353, filed Nov. 4, 1963.

In carrying out the process of this invention, the ultra-fine polytetrafluoroethylene resin having an average particle size, wet-sieve, of less than 100 microns, preferably no greater than about 50 microns, is subjected to agitation in aqueous medium, e.g. water, maintained at temperature above about 40° C. until agglomeration of the resin particles occurs. The temperature of the aqueous medium is preferably maintained in the range of about 40° to 80° C. Further, a resin-to-aqueous medium ratio of about 0.1 to 8.0 pounds per gallon is desirably employed.

Upon agitation, the resin particles readily agglomerate into soft cohesive particles of about 200 to 800 microns, average wet-sieve size. The agglomeration occurs in the first few minutes of agitation with a resulting improvement in bulk density and flow without degradation of the physical properties of the starting ultra-fine resin. The time required to accomplish agglomeration is generally less than one hour, preferably less than ½ hour. Continued agitation does not measurably improve the physical properties of the resin. After agglomeration, the resin is dewatered and dried.

The free-flowing, high strength resin of this invention has an average particle size, wet-sieve, of about 200 to 800 microns, a bulk density of at least about 500 grams per liter, preferably about 525 to 650 grams per liter, and a flow time of less than 200 seconds, preferably less than 120 seconds. The flow time tends to be lower as the particle size of the resin is increased. In addition, the unsintered flex strength of the resin is in the order of about 650 to 900.

The polytetrafluoroethylene resin prepared from porous, non-fibrous, ultra-fine resin has, in addition to the above properties, a surface area of about 1.6 to 2.2 square meters per gram of resin and a wet-sieve/sub-sieve ratio of about 28 to 50 (600 micron material). The high surface area favors outstanding unsintered preform strength, and the high wet-sieve/sub-sieve ratio, indicating the presence of a highly porous structure, favors easier molding.

The particle size of the final resin is determined by the following factors:

(a) resin loading (concentration of resin in agitated aqueous medium)
(b) temperature of aqueous medium
(c) agitation level.

With greater resin loading, the particle size of the final resin is increased. This appears to be due to a concentration effected during the agglomeration procedure.

Aqueous medium (water) temperature has a pronounced effect upon the particle size of the final resin. As temperature increases, the tendency is toward increase in size of the agglomerate, and increased power input to the agitation is required to offset excessive agglomeration. Although temperature of 100° C. or higher may be used, the resulting power requirements tend to become uneconomical. Tendency toward excessive agglomeration can also be offset with reduced resin loading of the aqueous medium at expense of throughput.

An important factor controlling particle size is the agitation employed. The higher the power input per gallon, the smaller the particle size. Power input can be varied by either changing the speed of the agitator or changing its configuration. In a typical system, there may be employed two marine propellers and an open turbine mounted on a vertical shaft in a baffled tank. The propellers are positioned as to effectively pull the floating resin down and into the central vortex. The necessary power input to achieve the desired particle size ranges from about 0.01 to 0.2 horsepower per gallon of liquid (i.e., aqueous medium). Alternatively, the process of this invention can be carried out using either an inclined agitator or an off-center agitator in an unbaffled tank.

Through judicious modification of one or more of these factors, average particle size may be controlled, for example, to produce agglomerates averaging 200, 300, 400 or 600 microns, depending upon requirements of particular fabricators or upon the type of final fabricated product desired. Products of this invention of given average particle size, say 300 microns, may vary from one another with respect to the range of sizes of individual agglomerates of which they are composed. Typical products may have ranges of individual particle sizes determined by the screen analysis referred to hereinafter defined by distribution functions within the range of about 0.3 to 0.8.

Although it is not desired to rely upon any particular theory, it is believed that the nature of the process of this invention is as follows. The ultra-fine resin particles are forced by the action of the agitator to pack into uniform agglomerates. This action combined with the effect of the warm water smooths the surface of the agglomerates to yield apparent individual smooth skinned particles.

In an effort to provide alternatives for preparing a free-flowing resin having superior physical properties, other methods were attempted and found to be inferior to that of this invention. One of the methods tried was the passage of the feed material through an inclined rotating tube whose temperature was in the range of 250° to 350° C. Agglomerates formed readily but comprised particles which were irregular in shape and had poor handling properties. Further, particle size control was poor and bulk density was low. A second method attempted was the use of a fluidized bed to agglomerate the feed material. In this method, hot air at a temperature of 150° to 350° C. was passed through a bed of fine resin particles to promote fluidization. Agglomeration occurred, but particle size control was extremely poor and bulk density was low. Difficulty was also encountered in maintaining the bed in fluidized condition since agglomeration and adhesion to the vessel walls occurred.

After sintering, the polytetrafluoroethylene resin of this invention has a tensile strength of at least about 3600 p.s.i., preferably at least about 3900 p.s.i. The dielectric strength of the resin is at least about 1200 volts per mil, preferably at least about 1300 volts per mil. The percent elongation of the resin is at least about 300, preferably at least about 325. The resin, on molding, compresses to a dense, strong preform of essentially zero void content at not greater than about 2000 p.s.i. pressure.

The polytetrafluoroethylene resin prepared from porous, non-fibrous, ultra-fine resin possesses particularly outstanding properties. In addition to the properties set forth above, this resin coalesces readily with very little dimensional change upon sintering. The anisotropic expansion factor of the resin is no greater than about 1.13, showing that the resin is non-fibrous, and is preferably about 1.09 to 1.13. The resin also has a surface roughness of no greater than about 70 microinches at about 3500 p.s.i., showing that the resin surface is extremely smooth and uniform.

The free-flowing resin of this invention can be extruded, molded into sheet and used in automatic molding machines due to its superior handling properties. The resin of this invention, while having superior handling and flow properties, retains the desired properties of the ultra-fine resin. Consequently, the resin permits improved, easier and more economical fabrication of premium molded products.

Another important feature of the resin is the absence of dependence of physical properties on particle size. The conventional, coarse, granular resin depends on reduction of particle size to improve physical properties. The present resin shows no substantial effect of particle size on physical properties.

Definitions of the terms used herein are as follows:

"Particle size, wet-sieve": The average size of the particle is measured by wet-sieve analysis using the technique of ASTM test number 1457–56T with the following screens, U.S. Standard Sieve Series, Nos. 18, 20, 25, 35, 40, 50, 60, 70, 80, 100 and 325. Average particle size is computed as set forth in the test description.

"Sub-sieve size": This value is a measure of surface area. The value corresponds to the theoretical diameter of the average particle on the assumption that the particles are non-porous spheres. The smaller the number the larger the surface area. The method for determining sub-sieve size is a convenient and quick way of obtaining relative particle size. A small particle size with a high surface area is desirable since with the greater surface area, more uniform coalescence of the particles occurs on sintering. The value obtained refers to the calculated specific surface particle diameter ($d_{ss}$) as determined via the air permeability method using, for example, the Subsieve Sizer manufactured by the Fisher Scientific Company. According to the air permeability method, air is passed upwardly through a layer of particles. Particles with a greater surface area will provide a greater resistance to the air. The resistance is measured and related to surface area, which, in turn, is related to particle size.

"Ratio wet-sieve/sub-sieve": This ratio is an indication of the porous structure of the resin. The higher the ratio the more porous the resin and the more easily the resin molds.

"Bulk density": This value is measured using the method described in ASTM test number D 1457. Resins of high bulk density are more easily handled and permit the use of shorter, lighter molds in the preparation of large billets.

"Flow time": This test measures the relative ease with which the resin can be fed or transferred. The test simulates actual operations encountered in fabrication of the resin, such as feeding a ram extruder or an automatic molding machine. These operations comprise vibratory feeding, screening and discharge through a restriction.

The apparatus employed consists of a Syntron Vibrator—Model SF-010 and control rheostat—Model FC-01 (manufactured by Syntron Company), modified as described. This apparatus is used to feed resin along a horizontal plane by means of vibrations occurring at 60 cycles/second. The amplitude of the vibration is controlled by varying the current to the vibrator by the rheostat. The current is adjusted until a 0.04 inch displacement is produced.

The feeder is a trough type feeder 6" wide and 17¾" long which is equipped with an upper metal shelf 3¾" long and 6" wide, placed 1½" above the base of the trough. An 8 mesh woven wire screen runs from the upper shelf 7" along the length of the feeder. 9¾" from the discharge edge of the shelf a V-shaped sheet metal gate intercepts the trough walls having an included angle toward the feed end of 130°. At the bottom of the center of the gate is a trapezoidal opening through which the resin passes. The opening has a 11/16" base, 21/32" sides and a ¼" top measured normal to the flow of resin.

To test the flow property, 200 grams of resin are placed on the upper shelf of the feeder. The test is run at about 70° F. and about 75% relative humidity. When the vibrator is turned on, the resin moves forward, drops through the screen and proceeds along the trough. The screen serves to break up any lumps that may exist. The combination of the gate and the trapezoidal opening restricts the flow of the resin. This causes the resin to bridge and pile up behind the gate. A poor flowing material will rapidly bridge under the action of the vibration and either cease to flow or flow with great difficulty through the gate.

The time in seconds required for the resin to pass from the upper shelf through the restricting gate is measured. Flow times in excess of 200 seconds are designated as negative flow. The test is repeated a minimum of five times to obtain an average value.

"Unsintered flex strength": This value is determined by the stress required for failure of an unsintered bar mold specimen. In order to test for flex strength, samples typically ½" x ½" x 5", are molded to a zero void content at 6000 p.s.i. and stressed at a controlled rate to failure; i.e. increasing stress is placed at the center of the bar of the resin until it fractures. The flex strength is measured in p.s.i. at the point of fracture. The greater the flex strength the less tendency there is for large sheets and mold specimens to crack on being removed from the fabrication mold.

"Dielectric strength": This value is determined using the method described in ASTM test number D 149. Such tests set forth below were conducted on 15 mil specimens.

"Tensile strength": This value is measured using the method described in ASTM test numbers D 638 and D 1457.

"Elongation": Percent elongation is measured using the method described in ASTM test numbers D 638 and D 1457.

"Required preform pressure": This value is the pressure required for producing a preform which, after sintering, has less than 0.1% voids. The void content is a measure of the residual entrapped air in the sintered preform. The percent void content is determined according to the following equation Percent Void Content =
$$\frac{\text{Inherent Specific Gravity minus Measured Specific Gravity}}{\text{Inherent Specific Gravity}} \times 100$$

"Surface roughness:" This is a measure of surface irregularities expressed in microinches. It can be determined by means of a Brush Surfindicator manufactured by the Brush Instrument Division of Clevite Corporation. A diamond stylus is passed over the surface of the resin in much the same way that a diamond stylus is passed through the grooves of a high fidelity phonograph record. The irregularities are amplified so that they are readily apparent on a meter attached to the instrument. The value is an average of microinch measurements over the surface of the specimen. The lower the value the superior the surface smoothness, enabling production of a superior grade of molded parts. This property is particularly important in the fabrication of parts and sheeting for anti-friction application.

"Anisotropic expansion factor:" This is a meaure of the dimensional change obtained on sintering. The value is determined as follows: Four and one-tenth grams of resin are weighed into a half-inch square rectangular mold cavity and compressed between metal plugs. Pressure is built up to 2000 p.s.i. during one minute, held during two minutes and then released. The roughly cubical preform is allowed to stand for 30 minutes. The width, breadth and height of the preform are measured (i.e., the X, Y and Z axes, respectively), where Z is the axis compressed during preforming. The measured preforms are baked 30 minutes at 380° C. ±0.5° C. to obtain a sintered piece, allowed to cool in air to room tempearture and remeasured. Anisotropic expansion factor is then the value of $Z_s/Z_p$ divided by $$\frac{X_s + Y_s}{X_p + Y_p}$$

where X, Y and Z are the axial measurements, subscripts $p$ and $s$ referring to preform and sintered piece, respectively. The dimensions of a fibrous material will change significantly on sintering, whereas a non-fibrous material will change very little and, consequently, has lower anisotropic expansion.

Figure 2:
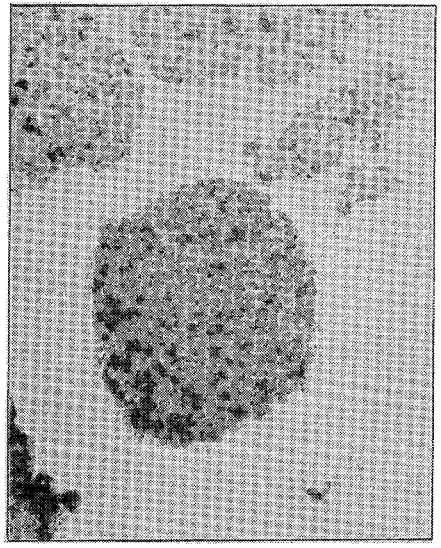

Referring to the accompanying drawings, FIGS. 1 and 2 are photographs of cross-sections of sintered, uncompressed resin particles of a conventional, coarse granular resin and the free-flowing, high strength, granular resin of this invention, respectively, magnified about 115 times. These photographs illustrate the difference in microstructure of the resins. The conventional resin shows the presence of large voids and a laminar type cross-section. The resin of this invention, on the other hand, shows a dense uniform structure with no evidence of either large voids or a laminar structure.

Figure 3:
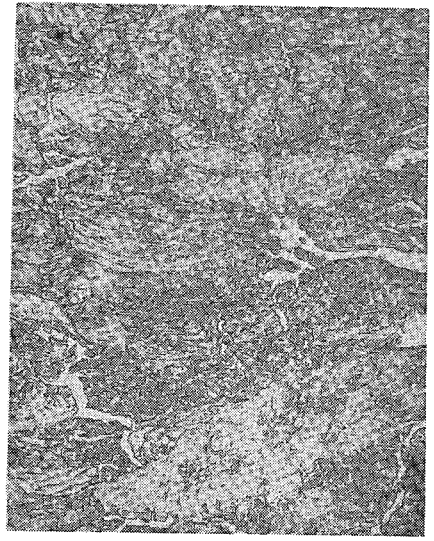
Figure 4:

FIGS. 3 and 4 are photographs of skived cross-sections of compressed (1000 p.s.i.) and then sintered resin particles of a conventional, coarse granular resin and the free-flowing, high strength, granular resin of this invention, respectively, magnified about 160 times. The conventional resin, unlike the resin of this invention, shows the presence of large irregular voids.

Examination of brittle fracture specimens of a conventional, coarse granular resin and the resin of this invention again reveals the differences between the resins. The brittle fracture specimens were prepared by molding the resin particles under low pressure, chilling in liquid nitrogen and then fracturing over a sharp edge. Particle structure was evident in the conventional resin but was not present in the resin of this invention. The particle structure of the conventional resin precludes its sintering to a dense high strength material, as contrasted to that of the present invention.

The outstanding properties of the polytetrafluoroethylene resin of the present invention are further illustrated by the following examples:

*Example I*

Several runs were carried out by agitating porous, non-fibrous, ultra-fine granular resin having an average particle size of less than 30 microns (prepared by reduction of a coarse material in an air mill, as described in my co-pending application Ser. No. 321,353) in water maintained at a temperature of 60° C. or 80° C. in a baffled tank. The agitator comprised two marine propellers together with, in some runs, an open turbine mounted on a vertical shaft. The resin particles agglomerated to form a free-flowing, granular polytetrafluoroethylene resin. After dewatering, the resulting resin was dried. The results obtained are summarized in the following table.

| Run | Water temperature, °C | Resin-to-water, lb./gal. | Time, mins. | R.p.m. | Horsepower/gal. of liquid | Resin properties | | Fabrication properties | | | |
|---|---|---|---|---|---|---|---|---|---|---|---|
| | | | | | | Average particle size, microns | Bulk density, grams/liter | Dielectric strength, volts/mil | Tensile strength, p.s.i. | Elongation, percent | Anisotropic expansion factor |
| 1 [1] | 60 | 0.4 | 30 | 750 | 0.03 | 400 | | 1,352 | 3,900 | 370 | 1.10 |
| 2 [1] | 80 | 0.4 | 30 | 750 | 0.03 | 520 | | 1,405 | 3,900 | 370 | 1.10 |
| 3 [1] | 60 | 0.5 | 15 | 500 | 0.01 | 500 | 530 | 1,323 | 4,000 | 385 | |
| | 60 | 0.5 | 30 | 500 | 0.01 | 510 | 542 | 1,490 | 4,500 | 415 | |
| | 60 | 0.5 | 60 | 500 | 0.01 | 500 | 573 | 1,666 | 3,900 | 340 | |
| 4 | 60 | 1.0 | 30 | 750 | 0.01 | 700 | | | | | 1.09 |
| 5 | 60 | 1.0 | 15 | 750 | 0.01 | 720 | 550 | 1,566 | 3,900 | 360 | |
| | 60 | 1.0 | 30 | 750 | 0.01 | 680 | 590 | 1,489 | 3,900 | 365 | |
| | 60 | 1.0 | 60 | 750 | 0.01 | 680 | 617 | 1,505 | | | |

[1] Open turbine employed.

Further tests were carried out in a manner similar to that described above. The surface area of the resulting resins varied from about 1.6 to 2.2 square meters per gram of resin, the wet-sieve/sub-sieve ratio from about 28 to 50 (600 micron material), the unsintered flex strength from about 650 to 900 p.s.i. and the surface roughness at about 3500 p.s.i. from about 40 to 70 microinches.

Example II

To study the effect of power input on particle size, runs were carried out in a baffled tank as described in Example I. The following conditions were used:

Agitator configuration -------- Two marine propellers and an open turbine.
Water temperature ------------ 60° C.
Resin-to-water ratio ---------- 0.33 lb./gal.
Time ------------------------- 15 mins.

Power input was varied by changing the agitator speed. As seen from the results set forth in the table below, particle size decreased with increasing power input. No significant change in physical properties, except for bulk density and handling properties, occurred.

| Run | Horsepower/gal. of liquid | Resin properties | | | | Fabrication properties | |
|---|---|---|---|---|---|---|---|
| | | Average particle size, microns | Distribution function | Bulk density, grams/liter | Flow time, secs. | Tensile strength, p.s.i. | Elongation, percent |
| 1 | [1] 0.05 | 270 | 0.60 | 527 | <200 | 3,649 | 322 |
| 2 | [2] 0.03 | 375 | 0.56 | 572 | 142 | 3,748 | 332 |
| 3 | [3] 0.018 | 520 | 0.55 | 592 | 52 | 3,801 | 336 |

[1] 700 r.p.m.
[2] 600 r.p.m.
[3] 500 r.p.m.

Example III

Samples of a conventional, coarse, granular resin and the free-flowing, high strength, granular resin of this invention were molded under varied pressures. The void content, after sintering, was measured. The following results were obtained:

| Molding Pressure, p.s.i. | Void content, percent | |
|---|---|---|
| | Conventional coarse, granular resin | Free-flowing, high Strength, granular resin |
| 500 | 12.7 | 3.2 |
| 1,000 | 5.2 | 0.75 |
| 2,000 | 1.2 | <0.1 |
| 4,000 | 0.0 | <0.1 |
| 6,000 | <0.1 | <0.1 |

RESIN PROPERTIES

| Resin type | Average particle size, microns | Distribution function | Bulk density, grams/liter | Flow time, secs. | Effect of decreasing particle size on properties | Sintered resin cross sections | Molding limitations |
|---|---|---|---|---|---|---|---|
| Conventional, Coarse, Granular Resin | 500 | 0.40–0.60 | 550 | <60 | Increases physical properties. | Voids present; laminar structure. | Poor physical properties. |
| Ultra-fine, Granular Resin | <50 | <0.40 | 325 | Neg. | ----do---- | Void free. | Poor handling properties. |
| Free-flowing, High Strength, Granular Resin. | 550 | 0.60 | 550 | <60 | No effect. | ----do---- | None. |
| Do | 300 | 0.55 | 525 | 100 | ----do---- | ----do---- | Do. |

Example III shows that the free-flowing, high strength, granular resin of this invention requires a pressure of not greater than about 2000 p.s.i. to obtain a resin which, after sintering, has less than 0.1% voids, whereas the conventional, coarse, granular resin requires a pressure of 4000 to 6000 p.s.i. to achieve the same low void content.

The above and following tables show a comparison of representative properties of typical samples of conventional, coarse, granular resin, ultra-fine, granular resin and the free-flowing, high strength, granular resin of this invention.

FABRICATION PROPERTIES

| Resin type | Pressure required for <0.1% voids, p.s.i. | Brittle fracture cross sections | Skived cross sections | Tensile strength, p.s.i. | Dielectric strength, volts/mil | Elongation, percent |
|---|---|---|---|---|---|---|
| Conventional, coarse, granular resin | 4000–6000 | Particle structure evident | Voids present | <2,800 | <1,000 | <300 |
| Ultra-fine, granular resin | Not in excess of about 2,000. | No detectable particle structure. | No visible voids | >3,600 | >1,200 | >300 |
| Free-flowing, high strength, granular resin. | ____do____ | ____do____ | ____do____ | >3,600 | >1,200 | >300 |

Since various changes and modifications may be made in this invention without departing from the spirit thereof, the invention is deemed to be limited only by the scope of the appended claims.

I claim:

1. A process for preparing a free-flowing, high strength, granular polytetrafluoroethylene resin comprising agglomerated particles having an average size, wet-sieve, within the range of about 200 to 800 microns which comprises subjecting an ultra-fine, granular polytetrafluoroethylene resin having an average particle size, wet-sieve, of less than 100 microns to agitation in a medium consisting of water, the ultra-fine, granular resin to water ratio being in the range of from 0.1 to 8.0 pounds per gallon, at temperature above about 40° C. until agglomeration of the resin particles occurs and separating the resulting agglomerated resin particles from the water medium.

2. The process of claim 1 wherein the ultra-fine granular resin has an average particle size, wet-sieve, of no greater than about 50 microns.

3. The process of claim 2 wherein the ultra-fine, granular resin comprises porous, non-fibrous particles prepared by reduction of coarse, granular resin in an air mill.

4. The process of claim 2 wherein the water medium is maintained at temperature of about 40° to 80° C.

5. The process of claim 2 wherein the power input ranges from about 0.01 to 0.2 horsepower per gallon of water medium.

6. The product obtained by the process of claim 1.

References Cited

UNITED STATES PATENTS

| | | | |
|---|---|---|---|
| 2,559,752 | 7/1951 | Berry | 260—92.1 |
| 2,750,350 | 6/1956 | Kroll | 260—92.1 |
| 3,161,707 | 12/1964 | Stirling | 264—117 |
| 3,186,928 | 6/1965 | Keaton et al. | 264—117 |
| 3,265,679 | 8/1966 | Black et al. | 260—92.1 |

OTHER REFERENCES

Doban, R. C. et al., The Physical Properties of "Teflon" Polytetrafluoroethylene. In the S.P.E. Journal, vol. 11, p. 17, November 1955, TP 986 AiS2.

JOSEPH L. SCHOFER, Primary Examiner.

J. A. DONAHUE, Assistant Examiner.